(12) United States Patent
Cui et al.

(10) Patent No.: US 11,693,546 B2
(45) Date of Patent: Jul. 4, 2023

(54) CONTROL APPARATUS WITH SETTING DATA CHANGE FUNCTION, AND SETTING DATA CHANGE METHOD OF THE CONTROL APPARATUS

(71) Applicant: Fanuc Corporation, Yamanashi (JP)

(72) Inventors: Hang Cui, Yamanashi (JP); Yousuke Koyanaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 98 days.

(21) Appl. No.: 17/038,249

(22) Filed: Sep. 30, 2020

(65) Prior Publication Data

US 2021/0117074 A1   Apr. 22, 2021

(30) Foreign Application Priority Data

Oct. 16, 2019   (JP) ................................. 2019-189602

(51) Int. Cl.
*G06F 3/04847* (2022.01)
*G06F 3/0481* (2022.01)
*G06F 3/041* (2006.01)
*G06F 3/04883* (2022.01)
*G06F 3/04842* (2022.01)

(52) U.S. Cl.
CPC .......... *G06F 3/04847* (2013.01); *G06F 3/041* (2013.01); *G06F 3/0481* (2013.01); *G06F 3/04842* (2013.01); *G06F 3/04883* (2013.01)

(58) Field of Classification Search
CPC ............. G06F 3/04847; G06F 3/04883; G06F 3/0481; G06F 3/04842; G06F 3/041; G05B 2219/35357; G05B 2219/36218; G05B 19/4093; Y02P 90/02
See application file for complete search history.

(56) References Cited

U.S. PATENT DOCUMENTS 5,552,688 A   9/1996  Haga
6,151,567 A * 11/2000  Ames ................... H04L 41/0846
                                                                  709/230
6,374,352 B1 * 4/2002  Goldman .............. G06F 9/4411
                                                                  713/1

(Continued)

FOREIGN PATENT DOCUMENTS

JP        05293550 A     11/1992
JP        06222819 A      8/1994

*Primary Examiner* — Matthew Ell
*Assistant Examiner* — Kenny Nguyen
(74) *Attorney, Agent, or Firm* — RatnerPrestia

(57) ABSTRACT

A control apparatus with a setting data change function for controlling operation of a control-target object comprises: a main control section that makes an operation command to the control-target object; an input section that receives an input of trial setting data for checking the operation of the control-target object; a setting data storage section including a first storage section that stores the trial setting data and a second storage section that stores the setting data; and a setting data management section that manages an input and a record into the setting data storage section, wherein the setting data management section includes: a mode switch section that switches operation modes; a memory synchronization section that establishes synchronization between the first storage section and the second storage section; and a memory discard section that discards the trial setting data.

7 Claims, 7 Drawing Sheets

(56) References Cited

U.S. PATENT DOCUMENTS

| | | | |
|---|---|---|---|
| 7,554,929 B1* | 6/2009 | Omar | H04L 43/10 370/252 |
| 10,891,091 B2* | 1/2021 | Kitayama | H04N 1/00015 |
| 2006/0132480 A1* | 6/2006 | Muller | G06F 11/3668 345/418 |
| 2006/0165421 A1* | 7/2006 | Yamazaki | G03G 15/553 399/9 |
| 2008/0058059 A1* | 3/2008 | Fitzsimons | G07F 17/3202 463/20 |
| 2008/0313006 A1* | 12/2008 | Witter | H02J 13/00017 705/7.17 |
| 2012/0011561 A1* | 1/2012 | Courtney | G06F 21/604 726/1 |
| 2013/0064558 A1* | 3/2013 | Futamata | G03G 15/205 399/15 |
| 2015/0007138 A1* | 1/2015 | Sabetta | G06F 11/3684 717/124 |
| 2016/0011888 A1* | 1/2016 | Bank | G06F 9/44505 713/100 |
| 2016/0034228 A1* | 2/2016 | Kaneko | G06K 15/005 358/1.13 |
| 2017/0194053 A1* | 7/2017 | Micheloni | G11C 5/005 |
| 2018/0121140 A1* | 5/2018 | Yamagami | G06F 3/1208 |
| 2019/0303060 A1* | 10/2019 | Ozeki | G03G 15/5012 |
| 2020/0125307 A1* | 4/2020 | Kitayama | H04N 1/00076 |

* cited by examiner

CONTROL APPARATUS WITH SETTING DATA CHANGE FUNCTION, AND SETTING DATA CHANGE METHOD OF THE CONTROL APPARATUS

RELATED APPLICATIONS

The present application claims priority to Japanese Patent Application Number 2019-189602 filed Oct. 16, 2019, the disclosure of which is hereby incorporated by reference herein its entirety.

BACKGROUND OF THE INVENTION

Field of the Invention

The present invention relates to a control apparatus with a setting data change function, and a setting data change method of the control apparatus.

Description of the Related Art

A control apparatus that issues a control command signal based on various setting data (parameters), such as a position and a machining condition, to a control-target object, such as an industrial machine, and thereby controls operation of the control-target object, is configured, for example, to receive inputs of numerical values included in the various setting data for making a control command as command values or target values, and to issue the control command signal based on differences between current values of the setting data and the target values. The control apparatus as described above, in general, issues the control command signal by combining the setting data with a machining program read from an external storage apparatus.

In such a control apparatus, when a change is made in material or shape of a workpiece, or in machining type or the like, the setting data needs to be changed to setting data that is suitable for machining the material or the shape, or for the machining type. In such a case, the control command signal is generated in such a manner that a test such as preliminary machining is performed beforehand, and data obtained through the test is applied as the setting data.

As an example of such a control apparatus, Japanese Patent Application Publication No. H05-293550 discloses a bending apparatus in a machine for bending a workpiece, including: a position and pressure command section that has a trial bending mode, in which a disturbance is estimated from a pressure and a speed or a displacement of a lower table by trial bending, and characteristic data on bending force and displacement of the lower table is collected at a time of bending a workpiece, and a pressure command mode, in which characteristic data on pressure and displacement of the lower table is collected at a time of bending a workpiece and compared with the characteristic data on the bending force and the displacement of the lower table obtained in the trial mode, and a pressure adjustment value according to thickness and material characteristics of the workpiece is calculated as a pressure command to obtain a final bending angle; and a pressure control section that controls pressure by applying the pressure command from the position and pressure command section and feedback on a flow change to a pressure control valve via a compensator that compensates for a deviation from a generated pressure. It is described that with the apparatus, the bending angle of the workpiece is not affected by oil temperature, ambient temperature, thickness of the workpiece, or material characteristics of the workpiece, and accuracy in bending is improved.

Japanese Patent Application publication No. H06-222819 discloses a machining program execution method in which a value of a parameter to be changed is preset for each machining type and stored in a memory in an NC apparatus beforehand, a setting change command that designates a machining type is programmed within a machining program, and when the setting change command is read by the machining program while the machining program is being executed, the value of the parameter stored in the memory as the parameter to be changed is changed to a value of the parameter stored in the memory in association with the machining type set in the setting change command, and then the machining program is executed. It is described that with the method, even when machining processes such as rough finishing, semi-finishing, and finishing are continuously performed by the NC apparatus, machining control of a machine tool can be performed by using an optimal parameter, without causing an increase in machining time or deterioration in machining accuracy.

SUMMARY OF THE INVENTION

For a parameter set for each machining, in general, trial machining is carried out beforehand, and a parameter deemed optimal through trial and error is adopted. At the time, in processes of the trial machining, a favorable machining result is obtained in some cases, and conversely, a failure or an unfavorable machining result is obtained in some cases.

In cases of conventional control apparatuses, when feedback control is performed by carrying out trial machining or when a parameter to be used in machining is read beforehand, the parameter, in general, is stored in a nonvolatile memory in which records are not lost. By using such a nonvolatile memory, parameter information is retained even when power supply is disconnected, when a control-target machine is activated, or the like.

However, in trial machining using a control-target machine, when a failure in operation of the machine or in machining of a workpiece is found at a time of checking operation of the machine, machining quality, and the like while the parameter is appropriately adjusted, it is necessary to revert the parameter to a value before an adjustment or a change is made because the set data (parameter) is inappropriate. At the time, to revert the parameter, a backup is made and the previous value is inputted again, or the data is undone by going back through historical data stored in the nonvolatile memory, and it is time-consuming to set optimal setting data for machining.

In view of such circumstances, for control of operation of a control-target object such as an industrial machine, a control apparatus and a setting data change method of the control apparatus are demanded that include a function capable of effectively choosing to discard or store setting data executed in trial operation (trial running) in adjustment of a position, a machining condition, and the like of the control-target object.

A control apparatus with a setting data change function for adjusting setting data when operation of a control-target object is controlled, according to an aspect of the present invention, comprises: a main control section that makes an operation command to the control-target object based on a control program; an input section that allows an operator to input trial setting data for checking the operation of the control-target object; a setting data storage section including a first storage section that stores the trial setting data and a second storage section that stores the setting data for making the operation command; and a setting data management section that manages an input and a record into the setting data storage section, wherein the setting data management section includes: a mode switch section that switches operation modes of the setting data storage section; a memory synchronization section that adds the trial setting data to the setting data by establishing synchronization between the first storage section and the second storage section; and a memory discard section that discards the trial setting data.

A setting data change method of a control apparatus for adjusting setting data when operation of a control-target object is controlled, according to another aspect of the present invention, wherein the control apparatus comprises: a main control section that makes an operation command to the control-target object based on a control program; an input section that allows an operator to input trial setting data for checking the operation of the control-target object; a setting data storage section including a first storage section that stores the trial setting data and a second storage section that stores the setting data for making the operation command; and a setting data management section that manages an input and a record into the setting data storage section, includes: inputting the trial setting data into the first storage section after an operation mode of the setting data storage section is changed to a trial mode; and discarding the trial setting data from the first storage section, or recording the trial setting data into the second storage section as the setting data, based on a selection signal indicating whether or not to discard the trial setting data.

According to the aspects of the present invention, the control apparatus comprising: the main control section that makes an operation command to the control-target object based on the control program; the input section that allows the operator to input the trial setting data for checking the operation of the control-target object; the setting data storage section including the first storage section that stores the trial setting data and the second storage section that stores the setting data for making the operation command; and the setting data management section that manages an input and a record into the setting data storage section, is configured such that after the operation mode of the setting data storage section is changed to the trial mode, the trial setting data is inputted into the first storage section, and the trial setting data is discarded from the first storage section or recorded into the second storage section as the setting data, based on the selection signal indicating whether or not to discard the trial setting data. Accordingly, in control of the operation of the control-target object, it is possible to efficiently choose to discard or store the setting data executed in the trial operation in adjustment of a position, a machining condition, and the like of the control-target object.

DETAILED DESCRIPTION OF THE PREFERRED EMBODIMENTS

Hereinafter, embodiments of a control apparatus with a setting data change function according to representative examples of the present invention, and a setting data change method of the control apparatus will be described with reference to drawings.

First Embodiment

Figure 1:
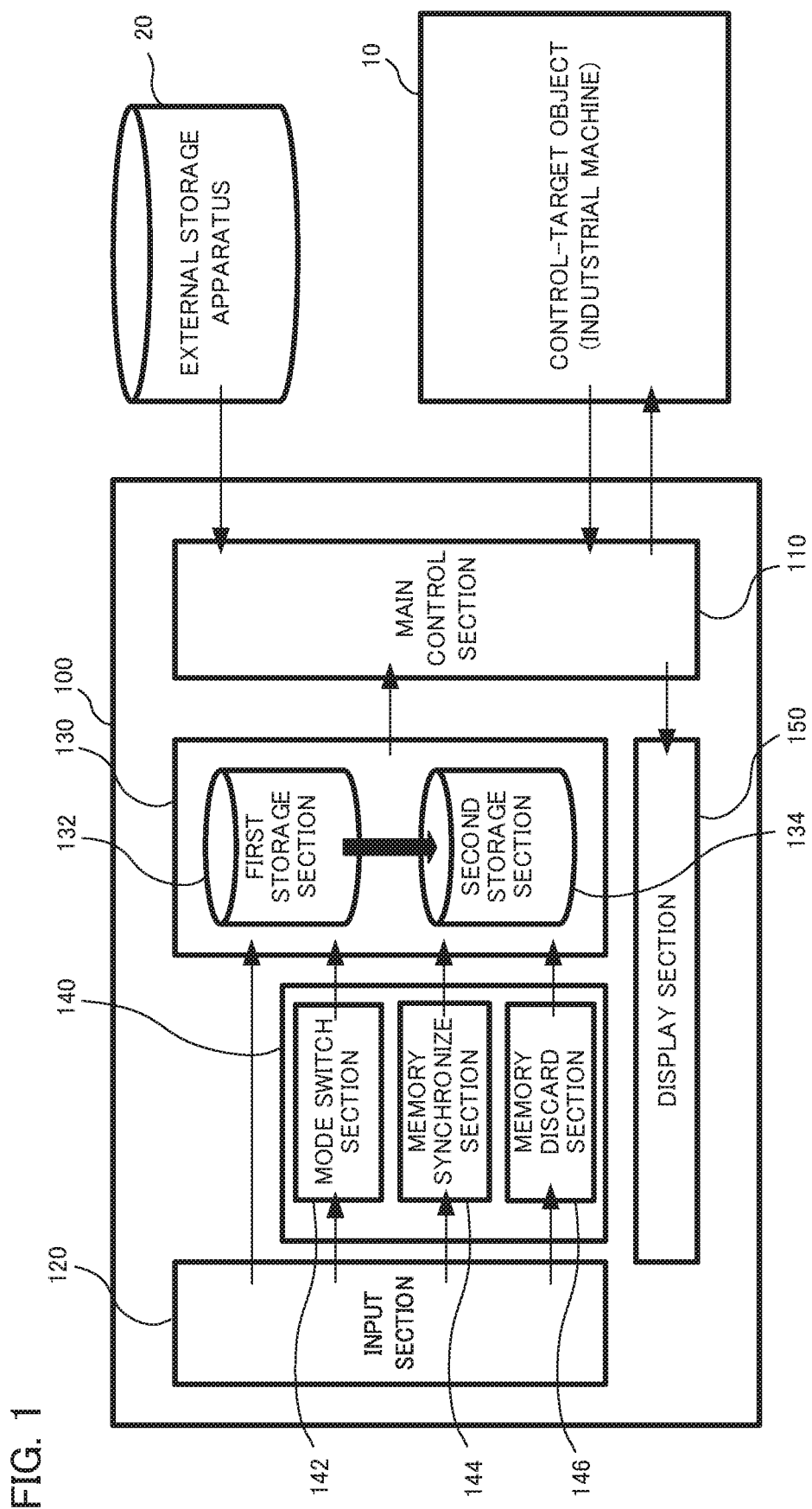
FIG. 1 is a block diagram showing a relationship between a control apparatus with a setting data change function according to a first embodiment of the present invention, and peripheral apparatuses.

FIG. 1 is a block diagram showing a relationship between a control apparatus with a setting data change function according to a first embodiment, which is a representative example of the present invention, and peripheral apparatuses. As shown in FIG. 1, the control apparatus 100 according to the first embodiment comprises: a main control section 110 that makes an operation command to a control-target object (for example, an industrial machine) 10 based on a control program; an input section 120 that allows an operator to input trial setting data for checking operation of the control-target object 10; a setting data storage section 130 including a first storage section 132 that stores the trial setting data and a second storage section 134 that stores setting data for making the operation command; a setting data management section 140 that manages an input and a record into the setting data storage section 130; and a display section 150 that displays the trial setting data, the setting data, a state of the control-target object 10, or the like in response to a display command from the main control section 110.

The control apparatus 100 is mutually connected to the control-target object 10 or an external storage apparatus 20 through a wired line, a communication link, or the like in a communicable manner, and issues various control commands to the control-target object 10 and also receives detection signals from various sensors (see a reference sign 12 in FIG. 6) attached to the control-target object 10. The control apparatus 100 loads a control program describing control operations of the control-target object 10 from the external storage apparatus 20, and also updates the machining program as necessary.

Here, in the specification of the present application, the "setting data" includes setting items required to control the operation of the control-target object 10, numerical values for controlling the operation, and the like, and can include, for example, a coordinate system of components included in the control-target object 10 and position data on the components, adjustment items of the components and adjustment quantities for the items, or, when the control-target object 10 is a machining apparatus for machining a workpiece, a machining condition (a parameter) and the like to be set at a time of machining the workpiece. The "setting data" is permanently recorded, or overwritten and stored, in the setting data storage section 130. A control command signal for the control-target object 10 is generated by combining the setting data with the control program.

On the other hand, the "trial setting data" is assumed to include a portion of the "setting data" that is changed according to a new operation environment or operational condition, when a change is made to an operation environment, an operational condition, or the like of the control-target object 10. In general, trial operation of the control-target object 10 in a "trial mode" is carried out by using the "trial setting data", and based on a result of the trial operation, it is determined whether or not the "trial setting data" is added as the "setting data", or the "setting data" is overwritten (updated) with the "trial setting data".

The main control section 110 is means for issuing an operation command signal to the control-target object 10, and includes functions such as a function of generating a control command signal by sequentially reading part of the control program from the external storage apparatus 20 and combining the read control program with the setting data or the trial setting data stored in the setting data storage section 130, and a function of receiving detection signals from the various sensors (not shown) provided for the control-target object 10 and adjusting the control command signal based on detection values of the detection signals. The main control section 110 may include a function of adding a control program to, or adjusting, the control program stored in the external storage apparatus 20 as necessary.

The input section 120 is an interface that allows an operator of the control apparatus 100 to switch on/off operation and to manually input various data and the like, and examples of the input section 120 include a keyboard, a pendant, a joystick, and the like. In the present invention, the operator can input, from the input section 120, the trial setting data required for trial operation that is performed to check the operation of the control-target object 10.

The setting data storage section 130 is means for storing the setting data to be combined with the control program, and includes, as described above, the first storage section 132 that stores the trial setting data and the second storage section 134 that stores the setting data, as shown in FIG. 1. Here, as an example of the setting data storage section 130, the first storage section 132 may be configured by using a volatile memory, the second storage section 134 may be configured by using a nonvolatile memory, and the first storage section 132 may be configured to be referred to for data to be combined with the control program when the main control section 110 generates the control command signal. The setting data storage section 130 establishes synchronization between (stores identical data in) the first storage section 132 and the second storage section 134 or discards the trial setting data temporarily retained in the first storage section 132, based on a signal from the setting data management section 140.

Figure 3:
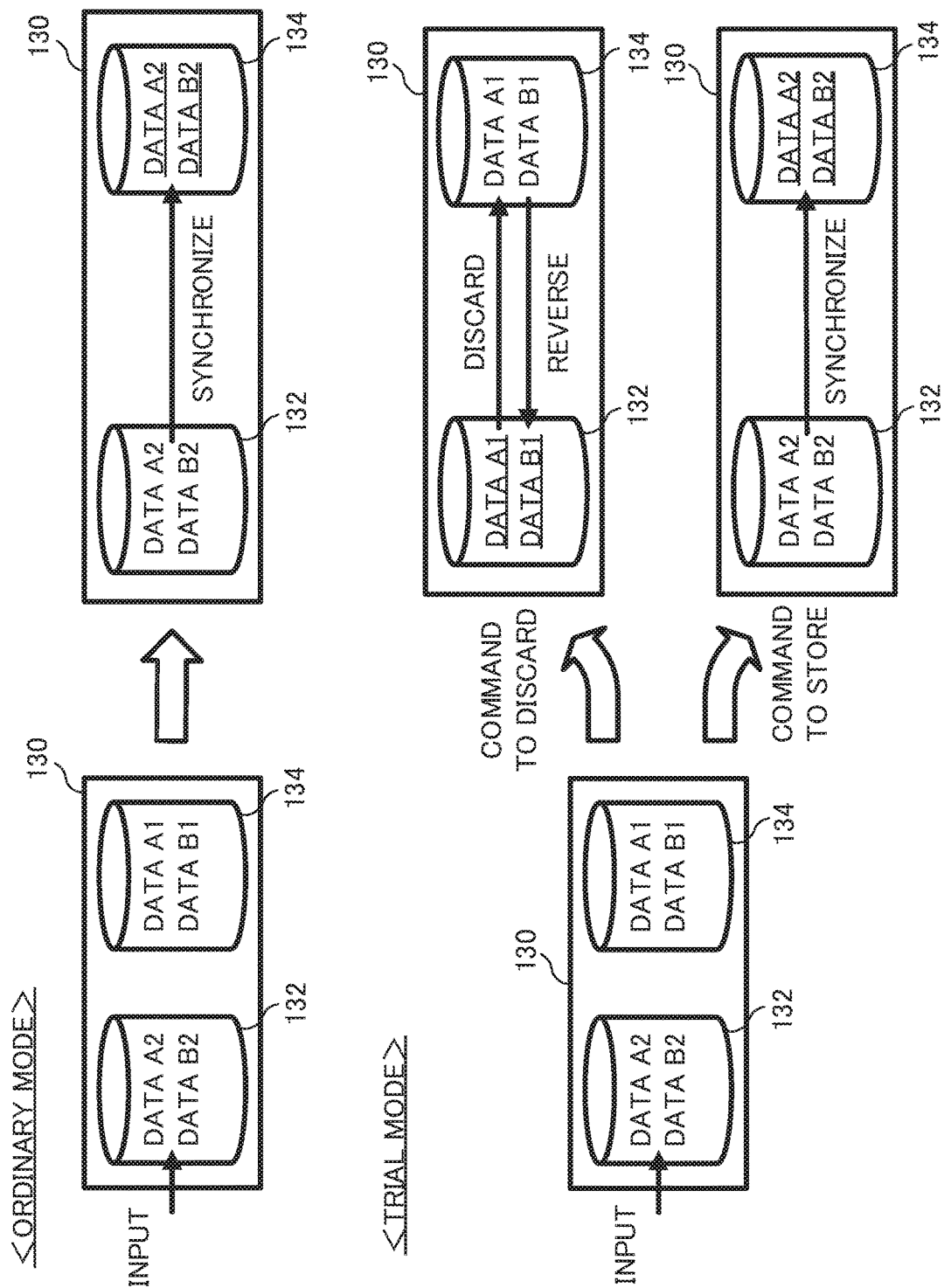
FIG. 3 is a block diagram showing an outline of operation of a setting data storage section, in the setting data change method of the control apparatus according to the first embodiment.

The setting data storage section 130 includes two operation modes, namely, "ordinary mode" and "trial mode", as shown in FIG. 3. The operation modes are switched to one another, based on a command signal from a mode switch section 142 of the setting data management section 140, which will be described later. Here, in the "ordinary mode", setting data (data A2, B2) inputted from the input section 120 is temporarily retained in the first storage section 132, and thereafter the first storage section 132 is automatically synchronized with the second storage section 134, whereby the second storage section 134 is overwritten with, or updated by additionally including, the inputted setting data (data A2, B2).

On the other hand, in the "trial mode", after setting data (trial setting data) from the input section 120 is inputted, automatic synchronization between the first storage section 132 and the second storage section 134 is stopped, and synchronization between the first storage section 132 and the second storage section 134 waits until a synchronization command signal is inputted. In any of the "ordinary mode" and the "trial mode", the setting data temporarily retained in the first storage section 132 is applied for the setting data to be used in combination with the control program executed by the main control section 110 described above. Thus, trial operation using the trial setting data can be performed in the "trial mode".

The setting data management section 140, as described above, is means for issuing a command signal for an operation of changing the setting data stored in the setting data storage section 130, and includes a mode switch section 142 that issues a mode switch command signal for switching the operation modes of the setting data storage section 130, a memory synchronize section 144 that issues a synchronization command signal for establishing synchronization between the first storage section 132 and the second storage section 134 and thereby adding the trial setting data to the setting data, and a memory discard section 146 that issues a discard command signal for discarding the trial setting data temporarily retained in the first storage section 132. Note that in the first embodiment, any of the mode switch section 142, the memory synchronize section 144, and the memory discard section 146 is configured to issue a command signal based on an input operation from the input section 120 made by the operator, as shown in FIG. 1.

Figure 5:
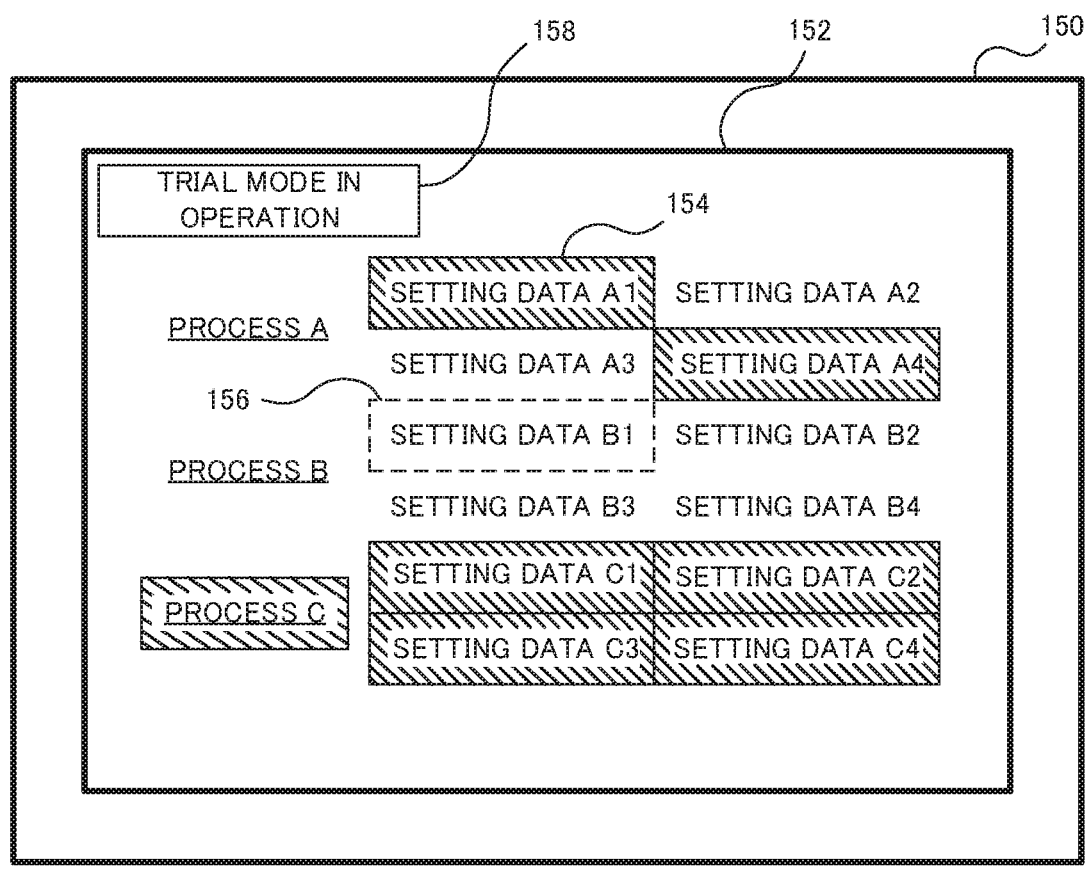
FIG. 5 is a front view showing an example of a display section when the modification example of the first embodiment is performed.

The display section 150 is means for displaying various information to the operator based on a display command from the main control section 110 and has a structure including a display screen 152, as shown in FIG. 5 for example. Note that although examples of the display section 150 as shown in FIG. 5 include a general TV monitor, a liquid crystal panel, and the like, a structure including the display screen 152 of a touch panel type integrated with the input section 120 may be adopted.

Figure 2:
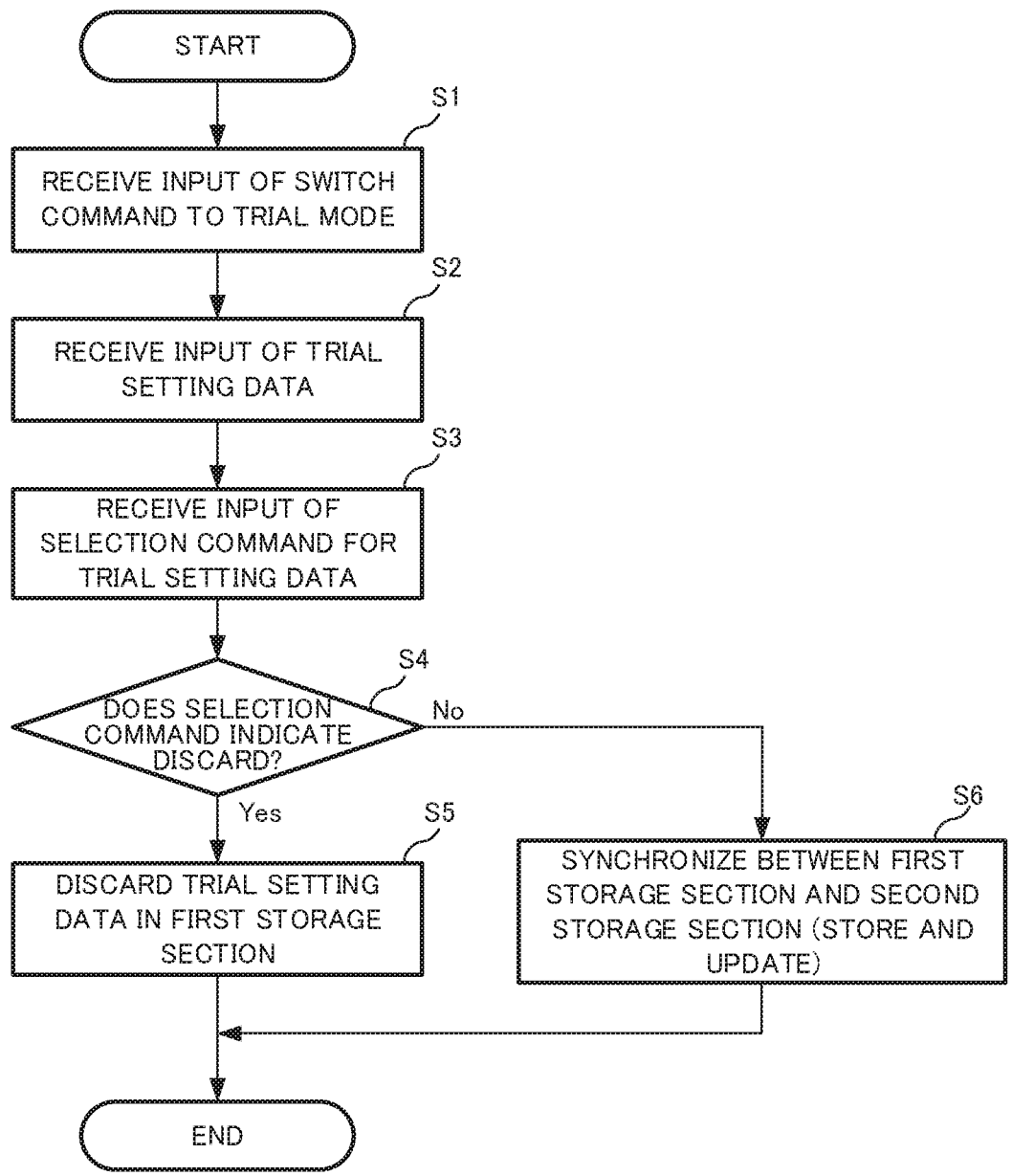
FIG. 2 is a flowchart showing an outline of a setting data change method of the control apparatus according to the first embodiment.

FIG. 2 is a flowchart showing an outline of a setting data change method of the control apparatus according to the first embodiment. FIG. 3 is a block diagram showing an outline of operation of the setting data storage section, in the setting data change method of the control apparatus according to the first embodiment.

In the setting data change method of the control apparatus 100 according to the first embodiment, as shown in FIG. 2, first, the operator inputs from the input section 120 a switch command to set the operation mode of the setting data storage section 130 to the "trial mode" (step S1). The switch command is sent to the mode switch section 142, and the mode switch section 142 that has received the switch command issues to the setting data storage section 130 a mode switch command signal for switching the operation mode from the "ordinary mode" to the "trial mode". The setting data storage section 130 receives the mode switch command signal for switching to the "trial mode" and switches the operation mode to the "trial mode".

Subsequently, the operator inputs "trial setting data" from the input section 120 (step S2). The inputted "trial setting data" (data A2, B2) is directly sent to the setting data storage section 130 and temporarily retained in the first storage section 132, as shown in FIG. 3.

Next, trial operation of the control-target object 10 is performed generally based on the inputted "trial setting data". Then, the operator determines, depending on a result of the trial operation, whether to store the inputted "trial setting data" as the "setting data", or to discard the "trial setting data". Note that the determination to store or discard the "trial setting data" may be made without performing the trial operation.

Subsequently, the operator inputs from the input section 120 a selection command to store or discard the "trial setting data" (step S3). The inputted selection command is sent to the setting data management section 140, and it is determined which the selection command indicates, to discard or to store (step S4).

When it is determined in step S4 that the selection command indicates "discard", the memory discard section 146 issues to the setting data storage section 130 a discard command signal for discarding the "trial setting data" retained in the first storage section 132. Then, as shown in FIG. 3, the "trial setting data" (data A2, B2) is discarded from the first storage section 132, which is then reverted to the previous "setting data" (data A1, B1) stored in the second storage section 134 (step S5), and the operation of changing the setting data is terminated.

On the other hand, when it is determined in step S4 that the selection command indicates "store", the memory synchronize section 144 issues to the setting data storage section 130 a synchronization command signal for synchronizing the "trial setting data" retained in the first storage section 132 with the second storage section 134 for storage. Then, as shown in FIG. 3, the "trial setting data" (data A2, B2) retained in the first storage section 132 is stored in the second storage section 134 as the "setting data" (data A2, B2) (step S6), and the operation of changing the setting data is terminated.

By executing the operation flow as described above, the setting data change method of the control apparatus according to the first embodiment can implement the control apparatus with the function that can input the trial setting data into the first storage section after changing the operation mode of the setting data storage section to the trial mode, and that can effectively choose to discard or store the setting data executed in the trial operation based on the selection signal indicating whether or not to discard the trial setting data, in order to discard the trial setting data from the first storage section or to record the trial setting data into the second storage section as the setting data. Accordingly, in control of the operation of the control-target object, it is possible to efficiently choose to discard or store the setting data executed in the trial operation in adjustment of a position, a machining condition, and the like of the control-target object.

Figure 4:
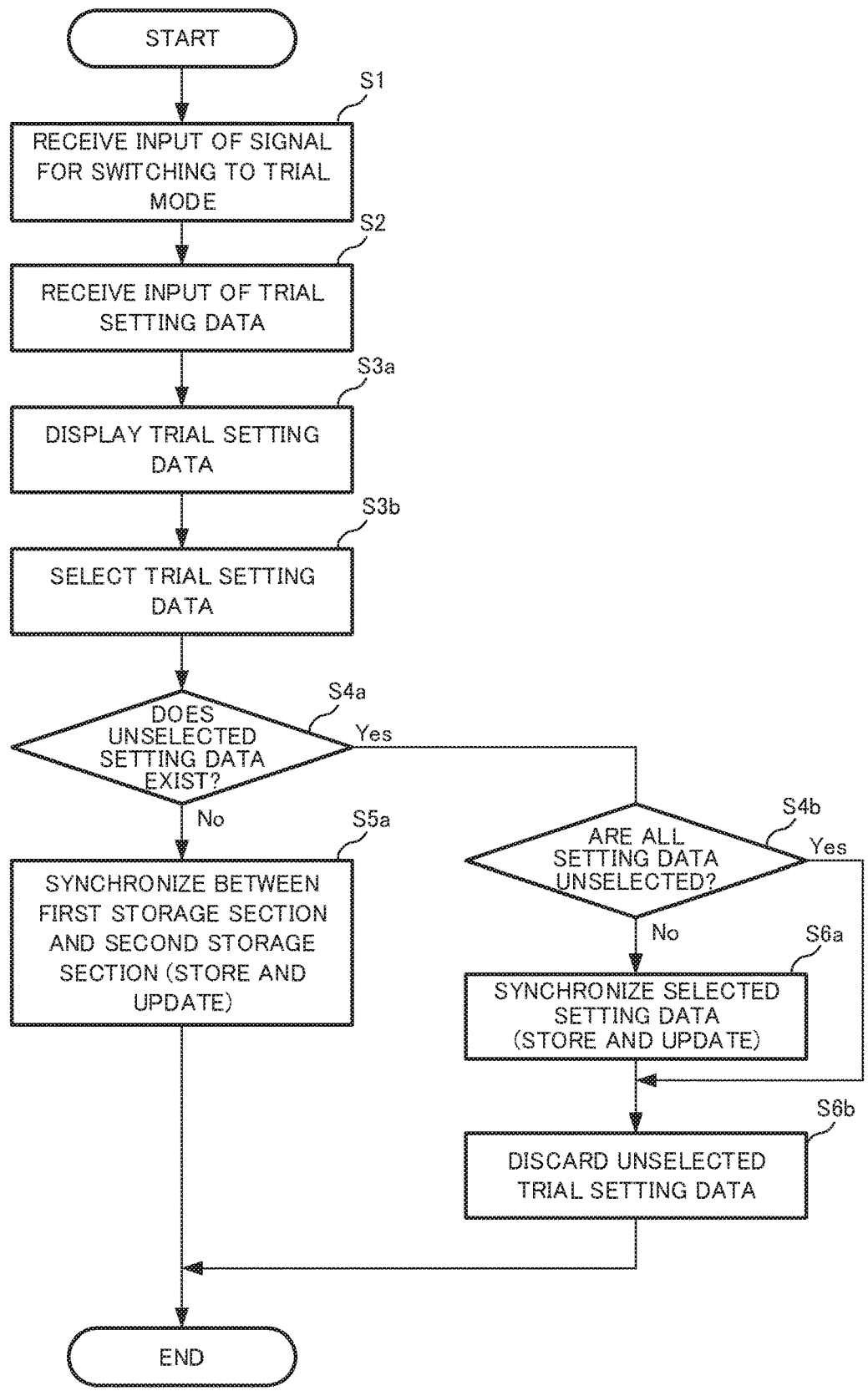
FIG. 4 is a flowchart showing an outline of a setting data change method of the control apparatus according to a modification example of the first embodiment.

Next, a modification example of the first embodiment will be described by using FIGS. 4 and 5. FIG. 4 is a flowchart showing an outline of a setting data change method of the control apparatus according to the modification example of the first embodiment. FIG. 5 is a front view showing an example of the display section when the modification example of the first embodiment is performed.

In the modification example of the first embodiment, as shown in FIG. 5, the display section 150 is used on which a plurality of setting items (for example, processes A to C), setting values (setting data A1 to C4), and the like are displayed in the display screen 152. Here, the display screen 152 is configured to display a selected area 154, which is a setting item or setting data made blinking or highlighted by a selection made by using the input section 120, and an unselected area 156, which is displayed in an ordinary manner.

In the setting data change method of the control apparatus 100 according to the modification example of the first embodiment, as shown in FIG. 4, first, the operator inputs from the input section 120 a switch command to set the operation mode of the setting data storage section 130 to the "trial mode" (step S1). The operation is similar to the operation in step S1 shown in FIG. 2.

Subsequently, when the operator inputs "trial setting data" from the input section 120 (step S2), the inputted "trial setting data" is directly sent to the setting data storage section 130 and temporarily retained in the first storage section 132, and at the same time, displayed in the display screen 152 of the display section 150 as shown in FIG. 5, based on a display command from the main control section 110 (step S3a).

Next, similarly to the case shown in FIG. 2, trial operation of the control-target object 10 is performed generally based on the inputted "trial setting data". Then, the operator determines, depending on a result of the trial operation, whether to store the inputted "trial setting data" as the "setting data", or to discard the "trial setting data". Note that the determination to store or discard the "trial setting data" may be made without performing the trial operation.

Subsequently, the operator operates the input section 120 while viewing the display screen 152, and inputs a selection command as to which setting item or setting data of the displayed "trial setting data" is stored (step S3b). At the time, as shown in FIG. 5, for example, a setting item or setting data desired to be stored is differentiated by displaying such a setting item or setting data as the selected area 154 that is made blinking or highlighted.

Subsequently, it is determined whether or not unselected setting data exists (whether or not an unselected area 156 exits) in the setting data displayed in the display screen 152 shown in FIG. 5, as a result of the selection in the "trial setting data" performed in step S3b (step S4a). In other words, in step S4a, it is determined whether or not setting data desired to be discarded exists.

When it is determined in step S4a that all setting data displayed in the display screen 152 is selected (that is, no unselected area 156 exists in FIG. 5), all of the "trial setting data" is regarded as data to store, and the memory synchronize section 144 issues to the setting data storage section 130 a synchronization command signal for synchronizing all of the "trial setting data" retained in the first storage section 132 with the second storage section 134 for storage. Then, all of the "trial setting data" (processes A to C, and data A1 to C4) retained in the first storage section 132 is stored in the second storage section 134 as the "setting data" (step S5a), and the operation of changing the setting data is terminated.

On the other hand, when it is determined in step S4a that unselected setting data exists in the display screen 152 (that is, at least one unselected area 156 exists in FIG. 5), it is further determined whether or not all setting data displayed in the display screen 152 is unselected (step S4b).

When it is determined in step S4b that not all setting data is unselected (that is, a selected area 154 and an unselected area 156 coexist), the memory synchronize section 144 issues to the setting data storage section 130 a synchronization command signal for synchronizing only the selected "trial setting data" in the first storage section 132 with the second storage section 134 for storage (step S6a). Thereafter, the memory discard section 146 issues to the setting data storage section 130 a discard command signal for discarding the unselected "trial setting data" in the first storage section 132 and reversing the previous "setting data" stored in the second storage section 134 (step S6b), and the operation of changing the setting data is terminated.

On the other hand, when it is determined in step S4b that all setting data is unselected (that is, no selected area 154 exists), the processing moves directly to step S6b, in which the memory discard section 146 issues to the setting data storage section 130 a discard command signal for discarding all of the unselected "trial setting data" in the first storage section 132 and reversing the previous "setting data" stored in the second storage section 134 (step S6b), and then the operation of changing the setting data is terminated.

By executing the operation flow as described above, the operator can choose to store data the operator desires to store, and to discard data the operator desires to discard while viewing the "trial setting data" displayed in the display screen 152 of the display section 150. In other words, an item selection function of selecting an item of the "trial setting data" can be further added to the control apparatus according to the present invention.

Note that in addition to the capability of the above-described item selection function of setting predetermined setting data (for example, A1, A4) in a predetermined setting item (for example, the process A) as selected areas as shown in FIG. 5, the item selection function may also be configured to, when a section of a setting item is selected (for example, when the process C is selected), automatically select all setting data (for example, C1 to C4) to be set for the setting item. The item selection function may also be configured to receive inputs of a new item and setting data from the input section 120 and to display the new item and setting data in the display screen 152. Thus, a burden on the operator at a time of selection can be reduced.

Moreover, as shown in FIG. 5, the display screen 152 may be configured to further include a mode display area 158 that displays a fact that the "trial mode" is currently in operation. Thus, the operator can avoid directly changing the "setting data" in the "ordinary mode" (that is, without via the "trial mode") and resulting in important data previously accumulated being overwritten and erased.

Second Embodiment

Figure 6:
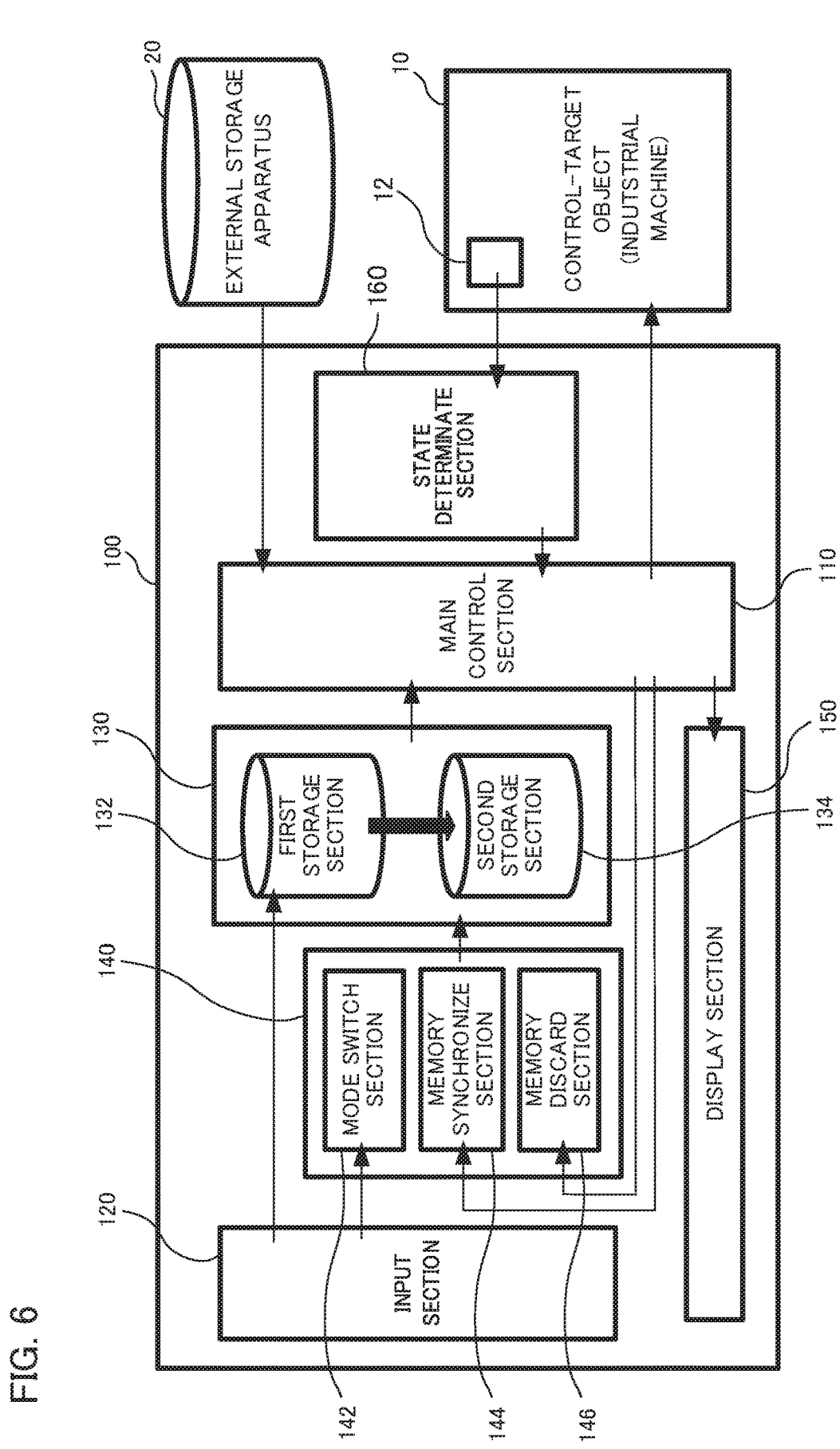
FIG. 6 is a block diagram showing a relationship between a control apparatus with a setting data change function according to a second embodiment of the present invention, and peripheral apparatuses.

FIG. 6 is a block diagram showing a relationship between a control apparatus with a setting data change function according to a second embodiment of the present invention, and peripheral apparatuses. Note that among the components shown in the block diagrams, the flowcharts, and the like of FIGS. 1 to 5, if components similar or common to the first embodiment can be adopted in the second embodiment, such components are denoted by the same reference signs, and repetition of the description is omitted.

As shown in FIG. 6, a control apparatus 100 according to the second embodiment includes a state determinate section 160 that determines, based on a detection signal obtained from a sensor 12 provided for the control-target object 10, whether or not control operation of the control-target object 10 is normally performed, in addition to the main control section 110, the input section 120, the setting data storage section 130, the setting data management section 140, and the display section 150. Here, for the sensor 12 provided for the control-target object 10, any sensor can be adopted that is capable of capturing a state of the control-target object 10 in control operation, and examples of the sensor 12 include a temperature sensor, a position sensor, a speed sensor, a pressure sensor, a tachometer, a voltmeter, an ammeter, and the like.

The state determinate section 160 receives a state quantity of the control-target object 10 in control operation, as a detection signal, from the sensor 12 and, based on the state quantity, for example, determines whether or not the control-target object 10 operates normally. The state determinate section 160 then sends a result of the determination about the control-target object 10 to the main control section 110.

In the second embodiment, the main control section 110, in addition to the function described in the first embodiment, further includes a function of issuing a selection command signal indicating whether to discard or store the "trial setting data", based on the result of the determination from the state determinate section 160. In other words, as shown in FIG. 6, the control apparatus 100 according to the second embodiment is different in a point that the memory synchronize section 144 and the memory discard section 146 of the setting data management section 140 do not operate according to a command from the input section 120, but operate based on a selection command from the main control section 110.

Figure 7:
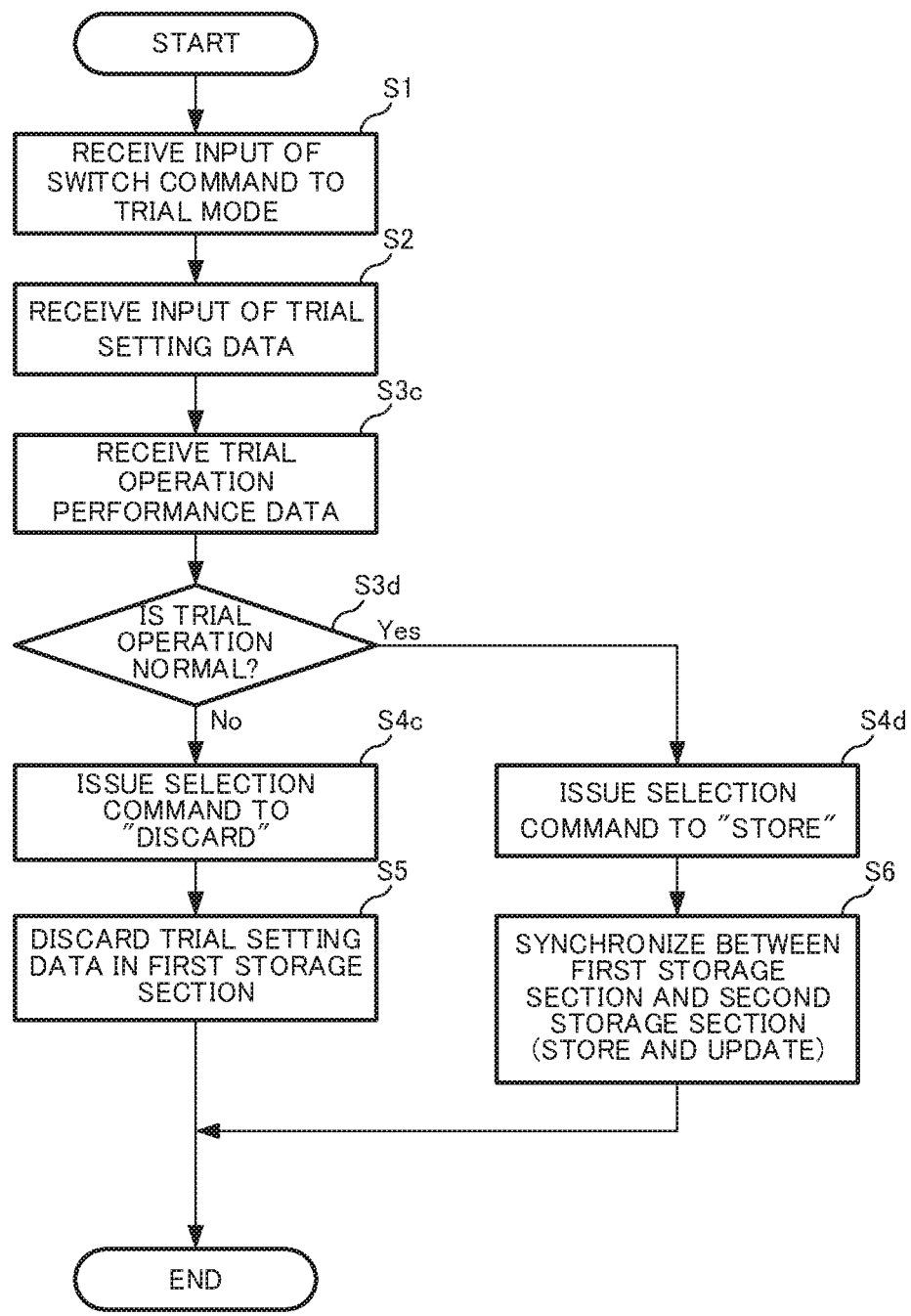
FIG. 7 is a flowchart showing an outline of a setting data change method of the control apparatus according to the second embodiment.

FIG. 7 is a flowchart showing an outline of a setting data change method of the control apparatus according to the second embodiment. In the setting data change method of the control apparatus 100 according to the second embodiment, as shown in FIG. 7, first, the operator inputs from the input section 120 a switch command to set the operation mode of the setting data storage section 130 to the "trial mode" (step S1), and inputs "trial setting data" (step S2). The inputted "trial setting data" is directly sent to the setting data storage section 130 and temporarily retained in the first storage section 132.

Next, using the inputted "trial setting data", trial operation of the control-target object 10 is performed based on a control command from the main control section 110. At the time, the state determination section 160 receives a detection signal (a state quantity of the control-target object 10) during control operation from the sensor 12 for the control-target object 10 (step S3c).

Subsequently, the state determinate section 160 determines, based on the received detection signal, whether or not the trial operation of the control-target object 10 is normally performed (step S3d). The determination at the time can be performed, for example, based on an indicator of whether or not the detected state quantity falls within a predetermined normal range, or the like.

When the state determinate section 160 determines in step S3d that the trial operation of the control-target object 10 is "abnormal", the main control section 110 issues a selection command signal indicating "discard" to the memory discard section 146 of the setting data management section 140 (step S4c). Subsequently, the memory discard section 146 that has received the selection command signal issues to the setting data storage section 130 a discard command signal for discarding the "trial setting data" retained in the first storage section 132. The "trial setting data" is discarded from the first storage section 132, which is then reverted to the previous "setting data" stored in the second storage section 134 (step S5), and the operation of changing the setting data is terminated.

On the other hand, when the state determinate section 160 determines in step S3d that the trial operation of the control-target object 10 is "normal", the main control section 110 issues a selection command signal indicating "store" to the memory synchronize section 144 of the setting data management section 140 (step S4d). Subsequently, the memory synchronize section 144 that has received the selection command signal issues to the setting data storage section 130 a synchronization command signal for synchronizing the "trial setting data" retained in the first storage section 132 with the second storage section 134 for storage. Then, the "trial setting data" retained in the first storage section 132 is stored in the second storage section 134 as the "setting data" (step S6), and the operation of changing the setting data is terminated.

By executing the operation flow as described above, in the setting data change method of the control apparatus according to the second embodiment, the function of choosing to discard or store described in the first embodiment can be executed not based on an operator input from the input section, but automatically through control by the main control section. Note that as a modification example of the second embodiment, a configuration may be made such that, by using the display section 150 as shown in FIG. 5, operations in steps S3a to S3b shown in FIG. 4 are added between step S2 and step S3c shown in FIG. 7.

Note that the present invention is not limited to the embodiments described above, and may be modified as appropriate without departing from the scope of the gist of the invention. In the present invention, modification of any component of the embodiments, or omission of any component of the embodiments, may be made within the scope of the invention.

The invention claimed is:

1. A control apparatus with a setting data change function for adjusting setting data when operation of a control-target object is controlled, the control apparatus comprising:
   a processor configured to issue an operation command to the control-target object based on a machining program for the control-target object;
   an input interface that allows an operator to input trial setting data for checking the operation of the control-target object;
   a display screen that displays at least the trial setting data; and
   a setting data storage including a first storage section that temporarily stores trial setting data inputted by the operator via the input interface and a second storage section, separate from the first storage section, that stores the setting data for making the operation command during a normal operation mode of the control-target object,
   wherein the processor is configured to receive a selection command input from the operator to select, among the trial setting data displayed on the display screen, a portion of a plurality of portions of the trial setting data to be recorded in the second storage section of the setting data storage as the setting data, and wherein the portion to be recorded in the second storage section is visually differentiated from non-selected portions of the plurality of portions of the trial setting data on the display screen,
   wherein the processor is further configured to:
   manage an input and a record into the second storage section of the setting data storage,
   issue a command signal to a mode switch that switches an operation mode of the setting data storage from an ordinary mode to a trial mode for inputting of the trial setting data in the first storage section of the setting data storage;
   store the inputted trial setting data in the first storage section of the setting data storage after the issuance of the command signal to the mode switch changing the operation mode of the setting data storage to the trial mode;
   perform a trial operation of the control-target object using the inputted trial setting data stored in the first storage section of the setting data storage, wherein in the trial operation, a result is provided to indicate a normal operation or abnormal operation of the control-target object when using the inputted trial setting data;
   determine, based on the result of performing the trial operation of the control-target object and the selection command input by the operator, which portion of the plurality of portions of the inputted trial setting data from the first storage section to store for the setting data of the second storage section used during the normal operation of the control-target object or discard from the first storage section,
   wherein:
   when the selection command is to store a first portion of the plurality of portions of the inputted trial setting data having the normal operation during the trial operation, issue a synchronization command signal for the selected inputted trial setting data for establishing synchronization between the trial setting data in the first storage section and the setting data in the second storage section, wherein the first portion of the inputted trial setting data of the first storage section inputted during the trial mode is added to the setting data of the second storage section, and
   when the selection command is to discard a second portion of the plurality of portions of the inputted trial setting data having the abnormal operation during the trial operation or when no selection command input is received from the operator, issue a discard command signal for the non-selected trial setting data, during the trial mode that discards the second portion of the inputted trial setting data from the first storage section and reverts the inputted trial setting data in the first storage section to previous setting data of the second storage section for the trial mode, and
   issue another command signal to the mode switch that switches the operation mode of the setting data storage from the trial mode to the normal mode,
   wherein the operation command for the normal mode operation of the control-target object is based on the synchronized setting data of the second storage section and the machining program.

2. The control apparatus with the setting data change function according to claim 1, wherein the display screen has a touch panel structure integrated with the input interface.

3. The control apparatus with the setting data change function according to claim 1, wherein the display screen further displays to the operator a fact that the operation mode is a trial mode.

4. The control apparatus with the setting data change function according to claim 1, wherein the processor is further configured to receive a detection signal from a sensor provided for the control-target object and, based on the detection signal, determine whether the operation of the control-target object is normal, and
   manage a record into the second storage section of the setting data storage, based on a result of the determination.

5. A setting data change method of a control apparatus for adjusting setting data when an operation of a control-target object is controlled, wherein the control apparatus comprises:

a processor configured to issue an operation command to the control-target object based on a machining program for the control-target object;

an input interface that allows an operator to input trial setting data for checking the operation of the control-target object;

a display screen that displays at least the trial setting data; and a setting data storage including a first storage section that temporarily stores trial setting data inputted by the operator via the input interface and a second storage section, separate from the first storage section, that stores the setting data for making the operation command during a normal operation mode of the control-target object, wherein the processor is configured to receive a selection command input from the operator to select, among the trial setting data displayed on the display screen, a portion of a plurality of portions of the trial setting data to be recorded in the second storage section of the setting data storage as the setting data, and wherein the portion to be recorded in the second storage section is visually differentiated from non-selected portions of the plurality of portions of the trial setting data on the display screen, wherein the processor is further configured to manage an input and a record into the second storage section of the setting data storage, the setting data change method including:

issuing a command signal to a mode switch of the control apparatus that switches an operation mode of the setting data storage from an ordinary mode to a trial mode for inputting of the trial setting data in the first storage section of the setting data storage;

storing the inputted trial setting data in the first storage section of the setting data storage after the issuance of the command signal to the mode switch changing the operation mode of the setting data storage to the trial mode;

performing a trial operation of the control-target object using the inputted trial setting data stored in the first storage section of the setting data storage, wherein in the trial operation, a result is provided to indicate a normal operation or abnormal operation of the control-target object when using the inputted trial setting data, determining, based on the result of performing the trial operation of the control-target object and the selection command input by the operator, which portion of the plurality of portions of the inputted trial setting data from the first storage section to store for the setting data of the second storage section used during the normal operation of the control-target object or discard from the first storage section, wherein:

when the selection command is to store any of a first portion of the plurality of portions of the inputted trial setting data having the normal operation during the trial operation, issuing a synchronization command signal for the selected inputted trial setting data for establishing synchronization between the trial setting data in the first storage section and the setting data in the second storage section, wherein the first portion of the inputted trial setting data of the first storage section inputted during the trial mode is added to the setting data of the second storage section, and when the selection command is to discard a second portion of the plurality of portions of the inputted trial setting data having the abnormal operation during the trial operation or when no selection command input is received from the operator, issuing a discard command signal for the non-selected trial setting data, during the trial mode that discards the second portion of the inputted trial setting data from the first storage section and reverts the inputted trial setting data in the first storage section to previous setting data of the second storage section for the trial mode; and issuing another command signal to the mode switch that switches the operation mode of the setting data storage from the trial mode to the normal mode, wherein the operation command for the normal mode operation of the control-target object is based upon the synchronized setting data in the second storage section and the machining program.

6. The setting data change method of the control apparatus according to claim 5, the display screen indicates to the operator, a fact that the operation mode is a trial mode.

7. The setting data change method of claim 5, further comprising, after receiving a detection signal from a sensor provided for the control-target object, determining, based on the detection signal, whether the operation of the control-target object is normal, and managing a record into the setting data stored in the second storage section of the setting data storage, based on a result of the determination.

* * * * *